Figure 3:
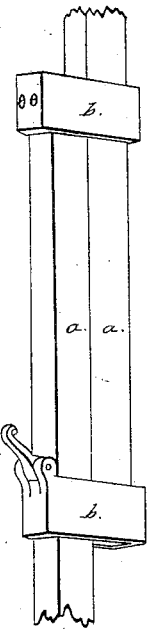

W. W. Armington,
Clothes Line Fastener,
N° 58,535. Patented Oct. 2, 1866.

Witnesses;
Levi E Coe
S H W Yale

Inventor;
W W Armington

UNITED STATES PATENT OFFICE.

W. W. ARMINGTON, OF NEW HAVEN COUNTY, ASSIGNOR TO E. A. KELSEY, OF MERIDEN, CONNECTICUT.

IMPROVED CLOTHES-POLE.

Specification forming part of Letters Patent No. 58,535, dated October 2, 1866.

*To all whom it may concern:*

Be it known that I, W. W. ARMINGTON, of the county of New Haven and State of Connecticut, have invented certain a new and useful Improvement in Adjustable Clothes-Poles; and I do hereby declare that the same is described and represented in the following specification and drawings; and to enable others skilled in the art to make and use the same, I will proceed to describe its construction and advantage by referring to the drawings, in which the same letters indicate like parts in each of the figures.

The nature of this improvement will be clearly understood from the specification and drawings. The object desired to be attained thereby is to produce a temporary support for a clothes-line, while they are hung thereon, for the purpose of keeping them (the clothes) in an elevated position while drying, &c.

The ordinary way of elevating clothes-lines is by the use of a pole of indefinite length, having, sometimes, a notch cut in the upper end, in which is placed the line, and when thus placed, (after the clothes are placed thereon,) is elevated and held in the desired position by drawing the lower end of the pole on the ground till the line is raised to a desired elevation. Such poles are objectionable, because different length poles are required, or they are left outdoors on the ground, are liable to be lost or broken, and not readily found when wanted for use. By this improvement they may be folded, and thereby rendered convenient for taking into the house, and thereby not liable to be left on the ground, broken, or carried away.

Figure 1:
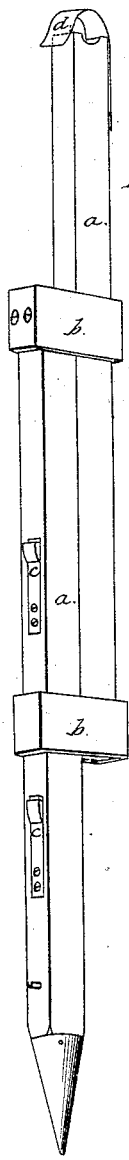
Figure 2:
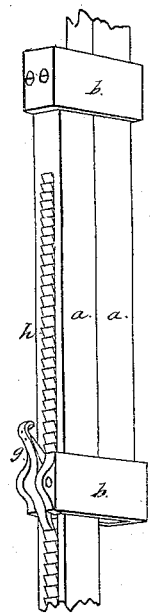
Figure 4:
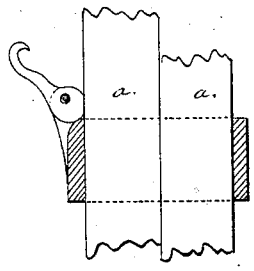

In the accompanying drawings, Figure 1 is a side elevation of this improvement. Figs. 2 and 3 show modifications in the mode of adjusting the length and of holding the parts in position. Fig. 4 is a section view, showing the mode or means by which the parts are held together when properly adjusted.

$a$ is the pole, made of any suitable material, and in two or more parts, having folding or sliding joints, (one or both,) by means of which the length of the pole is determined and adjusted. $b$ are clasps, which inclose the two parts of the pole, one of which is fastened to the end of one pole, and the other to the end of the other pole, so that the two poles may slide freely therein. $c$ is a spring-catch, properly secured to the pole, and at proper intervals, for the purpose of holding the pole at any proper adjustment by its springing out under the edge of either of the clasps $b$.

In Fig. 2 is shown a thumb pawl and ratchet, $g\ h$. The teeth of the ratchet may be cut in metal or in the wood itself. At the upper end of the pole is provided a spring-clasp, $d$, for receiving and holding the line in its proper place. The lower end is made pointed, and sometimes sheathed with metal, for the purpose of holding it steady in the ground.

In Figs. 3 and 4 is shown a cam-fastening, which may be used for holding the parts in a fixed position.

I believe I have thus shown the nature, construction, and advantage of this improvement, so as to enable others skilled to make and use the same therefrom.

I claim—

Making a clothes-line supporter, $a$, in two or more parts, with the clasps $b$ and catch $c$, substantially as and for the purpose described.

W. W. ARMINGTON.

Witnesses:
LEVI E. COE,
S. H. W. YIEB.